(12) United States Patent
Hirota

(10) Patent No.: US 8,003,249 B2
(45) Date of Patent: Aug. 23, 2011

(54) STACKED BATTERY

(75) Inventor: Yoshitomo Hirota, Sendai (JP)

(73) Assignee: NEC Energy Devices, Ltd., Sagamihara-shi, Kanagawa (JP)

( * ) Notice: Subject to any disclaimer, the term of this patent is extended or adjusted under 35 U.S.C. 154(b) by 0 days.

(21) Appl. No.: 12/323,860

(22) Filed: Nov. 26, 2008

(65) Prior Publication Data

US 2009/0136842 A1    May 28, 2009

(30) Foreign Application Priority Data

Nov. 26, 2007   (JP) ................................ 2007-303942

(51) Int. Cl.
*H01M 4/02*          (2006.01)
*H01M 10/02*        (2006.01)

(52) U.S. Cl. ........ 429/186; 429/123; 429/129; 429/131; 429/132; 429/135; 429/143; 429/146; 429/151; 429/152; 429/163

(58) Field of Classification Search .................. None
See application file for complete search history.

(56) References Cited

U.S. PATENT DOCUMENTS

2006/0166066 A1*   7/2006   Nishimura et al. ............. 429/32
2006/0257732 A1*   11/2006   Yageta et al. ................. 429/176
2006/0286453 A1*   12/2006   Nakagawa et al. ........... 429/208

FOREIGN PATENT DOCUMENTS

JP    2001-102050 A    4/2001
JP    2005-056672 A    3/2005

* cited by examiner

*Primary Examiner* — Patrick Joseph Ryan
*Assistant Examiner* — Ladan Mohaddes
(74) *Attorney, Agent, or Firm* — Westerman, Hattori, Daniels & Adrian, LLP

(57) ABSTRACT

A stacked battery sealed by a film casing shows a raised degree of resistance against vibrations. The stacked battery includes a stacked body formed by alternately laying plate-like positive electrodes and plate-like negative electrodes one on the other by way of separators, each of the positive electrodes and the negative electrodes having recessed sections and corresponding projecting sections, the recessed sections of each electrode being disposed vis-a-vis the projecting sections of one of the adjacent electrodes of the opposite polarity and the projecting sections of each electrode being disposed vis-a-vis the recessed sections of the other adjacent electrode of the opposite polarity except the those arranged closest to the exposed surfaces of the stacked body, and holding members respectively engaged directly or through at least one of the separator and the film casing with the recessed sections and the projecting sections of the electrodes arranged closest to the exposed surfaces, the holding members being rigidly secured to the film casing covering the stacked body and sealing the stacked battery, the positive electrodes and the negative electrodes being respectively connected to a positive terminal and a negative terminal.

12 Claims, 10 Drawing Sheets

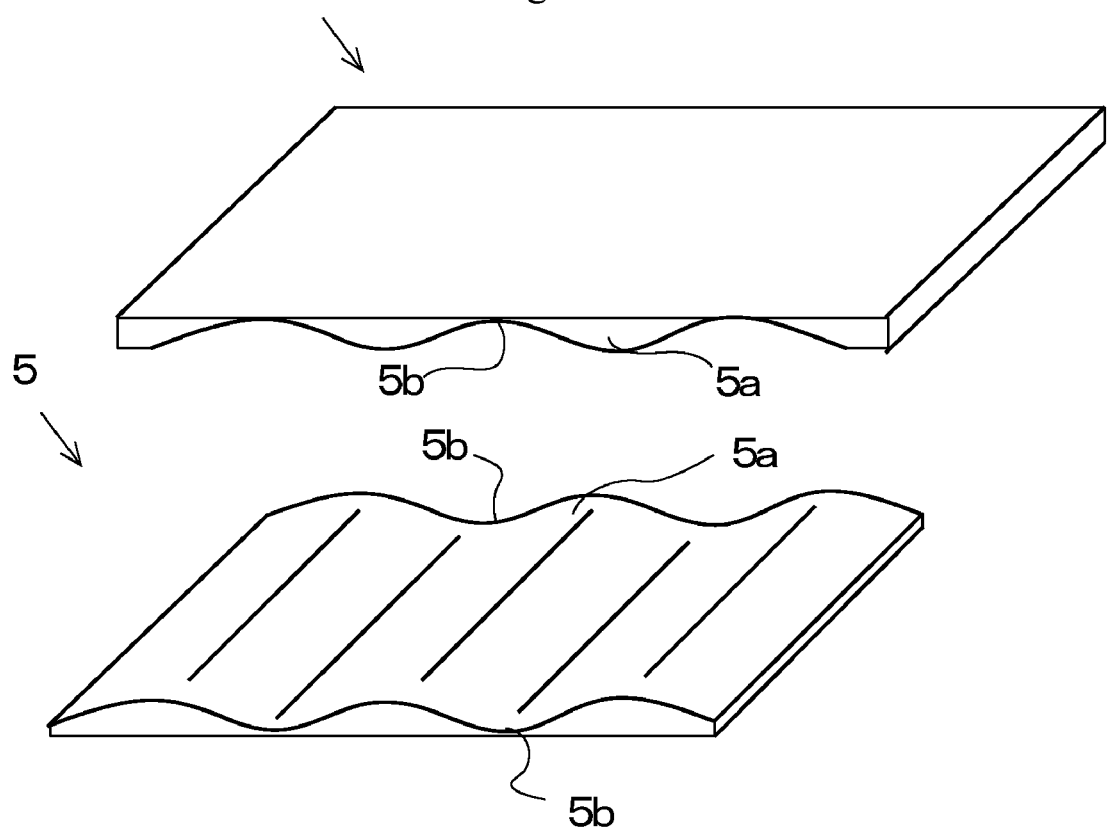

STACKED BATTERY

CROSS REFERENCE TO RELATED APPLICATIONS

This application is based upon and claims the benefit of priority from prior Japanese Patent Application No. 2007-303942, filed Nov. 26, 2007, the entire contents of which are incorporated herein by reference.

TECHNICAL FILED AND INDUSTRIAL APPLICABILITY OF THE INVENTION

This invention relates to a stacked battery such as a lithium ion secondary battery. More particularly, it relates to a stacked battery produced by casing a stacked body of a battery element formed by alternately laying positive electrodes and negative electrodes one on the other through separators by a film casing.

BACKGROUND OF THE INVENTION

Lithium ion secondary batteries are being employed as main power sources of small portable electronic appliances because they have remarkable advantages including that they show a high energy density and are hardly degraded after a number of charging/discharging cycles if compared with other secondary batteries.

Known lithium ion secondary batteries include those formed by putting a battery element into a metal can and sealing the can and those formed by covering a battery element by a film casing to produce a battery case and sealing the case.

Particularly, there is a demand for large-capacity batteries in power supply applications such as electric automobiles, hybrid automobiles and various codeless machines such as codeless electric tools. Stacked batteries formed by casing a battery element by a film casing to produce a battery case and sealing the case are believed to be particularly suitable for such applications because of a high weight efficiency and a high volume efficiency they provide.

Such a film casing is prepared by laying a film such as a polyethylene film that is highly resistive against corrosion in electrolytic solutions and showing an excellent heat sealing effect and a highly corrosion-resistant film such as a polyimide film or a polyester film respectively on the inner surface and on the outer surface of an aluminum foil.

FIGS. 10A, 10B and 10C of the accompanying drawings schematically illustrate an example of a stacked battery sealed by a film casing. FIG. 10A is a schematic perspective view of the stacked battery and FIG. 10B is a schematic plan view of the stacked battery, while FIG. 10C is a schematic cross sectional view of the stacked battery taken along line A-A' in FIG. 10B.

The stacked battery 1 is sealed by a film casing. It has a positive terminal 9 and a negative terminal 10 that operate as external connection terminals and are drawn out from the heat seal section of the film casing 2 by way of easily adhering seal members 11 that respectively cover the positive terminal 9 and the negative terminal 10 in order to prevent any liquid leakage from around the external connection terminals.

A flat stacked body 15 is formed by laying positive electrodes 6 and negative electrodes 8, both of which are flat and plate-like, one on the other by way of separators 7, and sealed by a film casing 2 and the prepared case is subsequently sealed to produce a stacked battery. Therefore, the stacked body can move in the case as the stacked battery is subjected to vibrations in any of the three directions that are orthogonal relative to each other. Then, as the stacked body 15 moves in the film casing 2 due to vibrations and repeatedly rubs the inner surface of the film casing 2, holes and fissures can be produced at the four corners of the film casing 2 and the parts thereof where the electrode terminals are drawn out to give rise to liquid leaking sections 20 as shown in FIG. 10B.

Proposals have been made to arrange a hygroscopic agent in parallel with the exposed surfaces of the stack of a battery element to absorb moisture in the inside of the film casing and alleviate the vibrations applied to the battery in a sealed battery in which a stacked body is sealed by a film casing (refer to, e.g., JP-A-2005-056672).

However, the hygroscopic agent arranged in parallel with the exposed surfaces of the stacked body of a battery element cannot prevent the film casing from being damaged when the stacked body is subjected to large vibrations for a long period of time.

However, while such a technique of providing aligning sections can hold the positional integrity of the positive electrodes and the negative electrodes of the stacked body of a battery element, it cannot solve the problems that arise due to repeated contacts of the stacked body of a battery element with the inside of the film casing covering the stacked body if it is applied to a battery covered by a film casing and sealed.

However, while such a technique of providing aligning sections can hold the positional integrity of the positive electrodes and the negative electrodes of the stacked body of a battery element, it cannot dissolve the problems that arise due to repeated contacts of the stacked body of a battery element with the inside of the film casing covering the stacked body if it is applied to a battery covered by a film casing and sealed.

Therefore, the object of the present invention is to provide a stacked battery which is produced by sealing a stacked body by a film casing and sealing the latter and of which performance is not deteriorated due to leakage of an electrolytic solution and intrusion of moisture from the atmosphere because of a scratch, crack or the like formed on the film casing after vibrations are repeatedly applied thereto.

SUMMARY OF THE INVENTION

According to the present invention, the above object is achieved by providing a stacked battery including: a stacked body formed by alternately laying plate-like positive electrodes and plate-like negative electrodes one on the other by way of separators, each of the positive electrodes and the negative electrodes having recessed sections and corresponding projecting sections, the recessed sections of each electrode being disposed vis-a-vis the projecting sections of one of the adjacent electrodes of the opposite polarity and the projecting sections of each electrode being disposed vis-a-vis the recessed sections of the other adjacent electrode of the opposite polarity except the those arranged closest to the exposed surfaces of the stacked body; and holding members respectively engaged directly or through at least one of the separator and the film casing with the recessed sections and the projecting sections of the electrodes arranged closest to the exposed surfaces, the holding members being rigidly secured to the film casing covering the stacked body and sealing the stacked battery, the positive electrodes and the negative electrodes being respectively connected to a positive terminal and a negative terminal.

Preferably, in a stacked battery as defined above, the holding members have a profile that makes the members snugly engage with the recessed sections or the projecting sections.

Preferably, in a stacked battery as defined above, the holding members are arranged in the inside of the film casing and pressed by the film casing due to the pressure difference acting on the inner and outer surfaces of the film casing.

Preferably, in a stacked battery as define above, the holding members are arranged outside the film casing and secured to the film casing by an adhesive agent, adhesive tapes or removable securing means.

Preferably, in a stacked battery as defined above, the holding members are formed by using rod-shaped members or plate-shaped members. When the holding members are formed by using plate-shaped members, the plate-shaped members have a surface size not smaller than that of the stacked body of the battery element and integrally formed with the respective holding members.

Preferably, in a stacked battery as defined above, the holding members are hollow members to make the stacked battery show a high degree of strength and lightweight.

As described above, a stacked battery according to the present invention may be a lithium ion battery, for example, and includes a stacked body formed by alternately laying flat plate-like positive electrodes and flat plate-like negative electrodes one on the other by way of separators, each of the positive electrodes and the negative electrodes having recessed sections and corresponding projecting sections, either the recessed sections or the projecting sections of each electrode being formed on the surfaces thereof for causing a battery reaction to take place, the recessed sections of each electrode being disposed vis-a-vis the projecting sections of one of the adjacent electrodes of the opposite polarity and the projecting sections of each electrode being disposed vis-a-vis the recessed sections of the other adjacent electrode of the opposite polarity except those arranged closest to the exposed surfaces of the stacked body.

Further, holding members are arranged and respectively engaged directly or through at least one of the separator and the film casing with the recessed sections and the projecting sections of the electrodes arranged closest to the exposed surfaces.

The holding members being rigidly secured to the film casing covering the stacked body and sealing the stacked battery. Thus, the present invention provides a highly reliable stacked battery that can find applications that are continuously subjected vibrations. Possible applications of the present invention include automobiles.

BRIEF DESCRIPTION OF THE DRAWINGS

The invention will be described with reference to the accompanying drawings, wherein like numbers reference like elements:

FIG. 7 is a schematic illustration of holding members that can be used for the embodiment of stacked battery of FIGS. 6A through 6C;

DESCRIPTION OF THE EXEMPLARY EMBODIMENTS

It has been a general idea that, in a stacked battery having a battery element of a stacked body formed by alternately laying plate-like positive electrodes and plate-like negative electrodes one on the other by way of separators, highly flat positive electrodes and highly flat negative electrode are preferably employed.

However, according to the present invention, either recessed sections or projecting sections are formed on one of the surfaces where a battery reaction takes place of each of the plate-like positive electrodes and the plate-like negative electrodes and either projecting sections or recessed sections, whichever appropriate, are formed on the opposite surface of the electrode. The recessed sections of each electrode are disposed vis-a-vis the projecting sections of one of the adjacent electrodes of the opposite polarity and the projecting sections of each electrode are disposed vis-a-vis the recessed sections of the other adjacent electrode of the opposite polarity. Holding members are arranged and respectively engaged with the recessed sections and the projecting sections of the electrodes respectively arranged closest to the exposed surfaces. Then, the holding members are rigidly secured to the film casing.

Then, as a result, it is found that the stacked body is integrally secured with the film casing so that it does not repeatedly contact or collide with the inner surface of the film casing if repeatedly subjected to vibrations and the film casing is prevented from being damaged.

Now, the present invention will be described in greater detail below by referring to the accompanying drawings that illustrate exemplary embodiments of the invention.

Figure 1A:
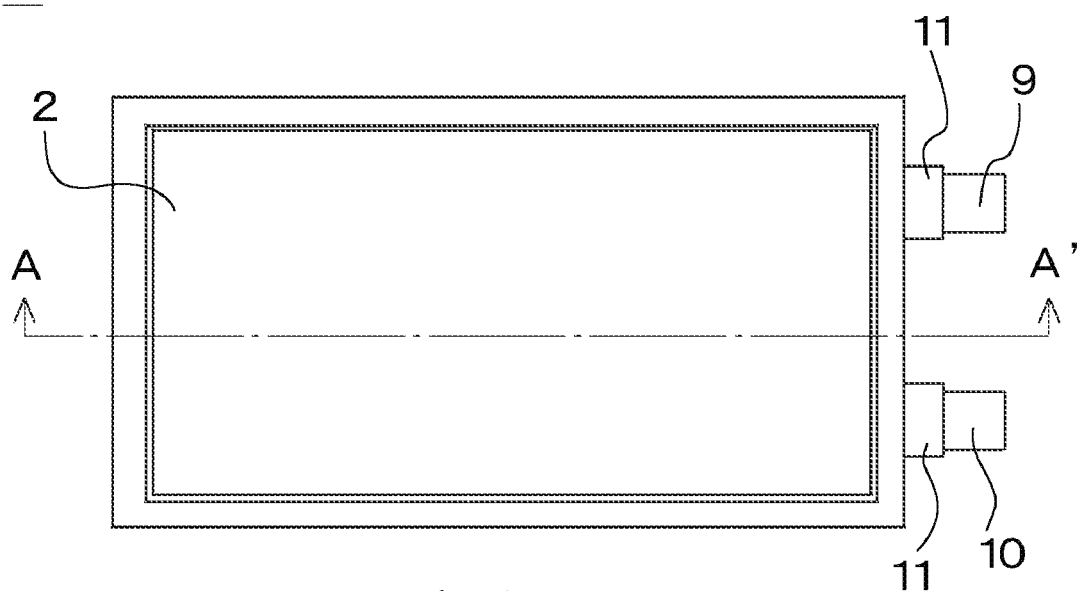
FIGS. 1A, 1B and 1C are schematic illustrations of an embodiment of stacked battery of according to the present invention.
Figure 1B:
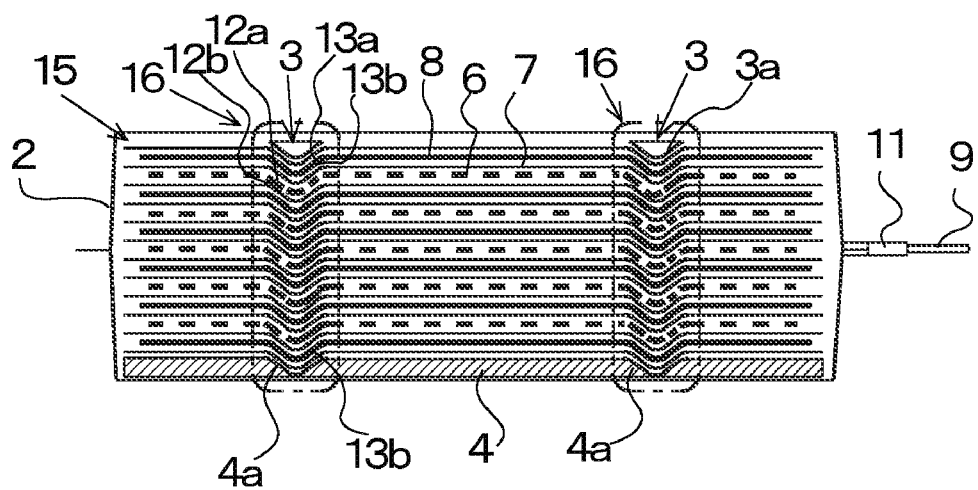
Figure 1C:
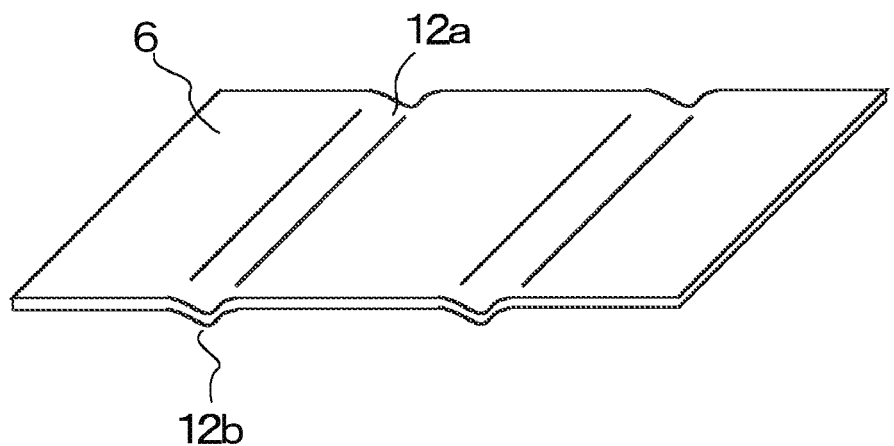

FIGS. 1A, 1B and 1C are schematic illustrations of an embodiment of stacked battery according to the present invention. FIG. 1A is a schematic plan view of the stacked battery and FIG. 1B is a schematic cross sectional view taken along line A-A' in FIG. 1A, showing the thickness with an enlarged scale. FIG. 1C is a schematic perspective view of a positive electrode of the stacked body of the stacked battery.

The stacked battery 1 is formed by laying positive electrodes 6 and negative electrodes 8 alternately one on the other by way of separators 7. The recessed sections 12a formed on a positive electrode 6 are aligned with the respective projecting sections 13b formed on the negative electrode 8 that is laid on the positive electrode 6 by way of a separator 7. Similarly, the projecting sections 12b formed on a positive electrode 6 are aligned with the respective recessed sections 13a formed on a negative electrode 8 laid under the positive electrode 6 by way of another separator 7. A stacked body 15 is formed in this way.

The negative electrodes 8 that are arranged near the opposite ends of the stacked body 15 so as to be closest to the respective exposed surfaces are also provided with recessed sections and projecting sections. A projecting holding member 3 to be engaged with the recessed sections of the uppermost negative electrode 8 by way of a separator 7 operates as holding sections 16 along with the recessed holding member 4 to be engaged with the projecting sections of the lowermost negative electrode 8 by way of a separator 7.

The positive terminal 9 connected to the positive electrodes 6 are covered by a seal member 11 at a seal section of the film casing 2. Similarly, the negative terminal 10 connected to the negative electrodes 8 is covered by a seal member 11 at another seal section of the film casing 2.

After the projecting holding member 3 and the recessed holding member 4 are fitted to the stacked body 15 and the stacked body 15 is sealed by means of the film casing 2 except an electrolytic solution injection port, the internal pressure is reduced and the electrolytic solution injection port is sealed. Then, the film casing 2 is pressed against the stacked body 15 due to the pressure difference between the inside and the outside thereof, where the atmospheric pressure prevails, so that the projecting holding member 3 and the recessed holding member 4 are integrally put together with the stacked body 15 to prevent the stacked body 15 from moving in the inside of the film casing 2.

Each positive electrode 6 of the stacked battery of the embodiment illustrated in FIGS. 1A and 1B is provided with two straight grooves having a V-shaped cross section as shown in FIG. 1C. The grooves are formed by heat press molding or the like so as to run in parallel with each other and also with the side where the electrode terminals are fitted. Thus, each of the grooves of a positive electrode produces a recessed section 12b on one of the surfaces thereof and a projecting section 12a on the other surface thereof. For example, each groove may show a cross section of a 3 mm high regular triangle and the cross section of the vertex of the triangle, or the V-shape, may be made to show a radius of curvature of 3 mm. While FIG. 1C shows a positive electrode 6, each negative electrode also shows a similar profile.

While each electrode is provided with two grooves having a V-shaped cross section in the above description, it may alternatively be provided with three or more than three grooves having a V-shaped cross section.

Figure 2A:
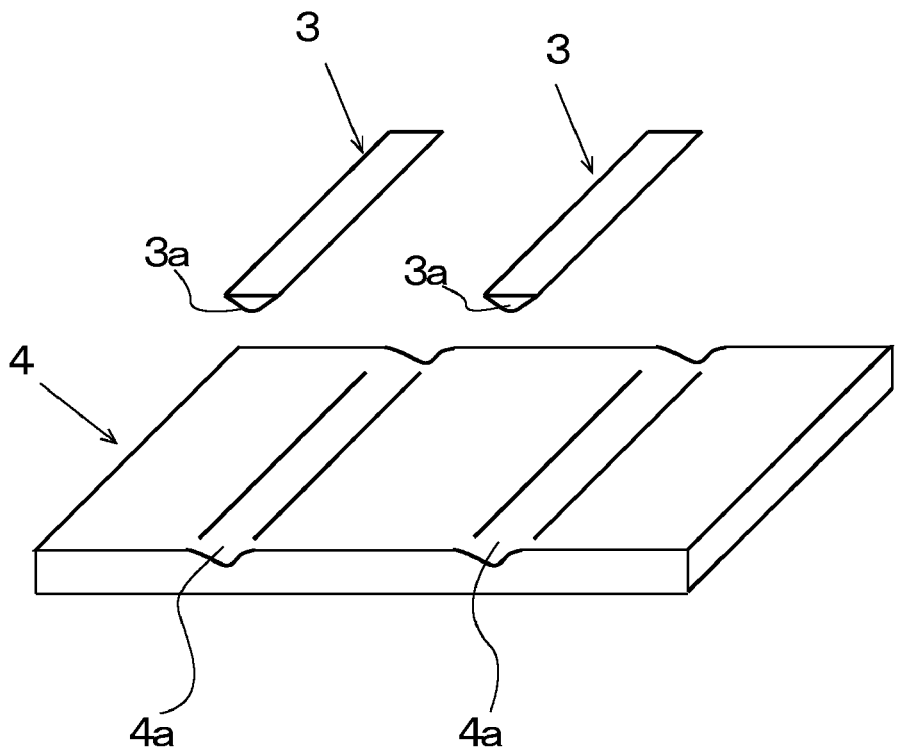
FIGS. 2A and 2B are schematic illustrations of holding members that can be used for the embodiment of stacked battery of FIGS. 1A through 1C.
Figure 2B:
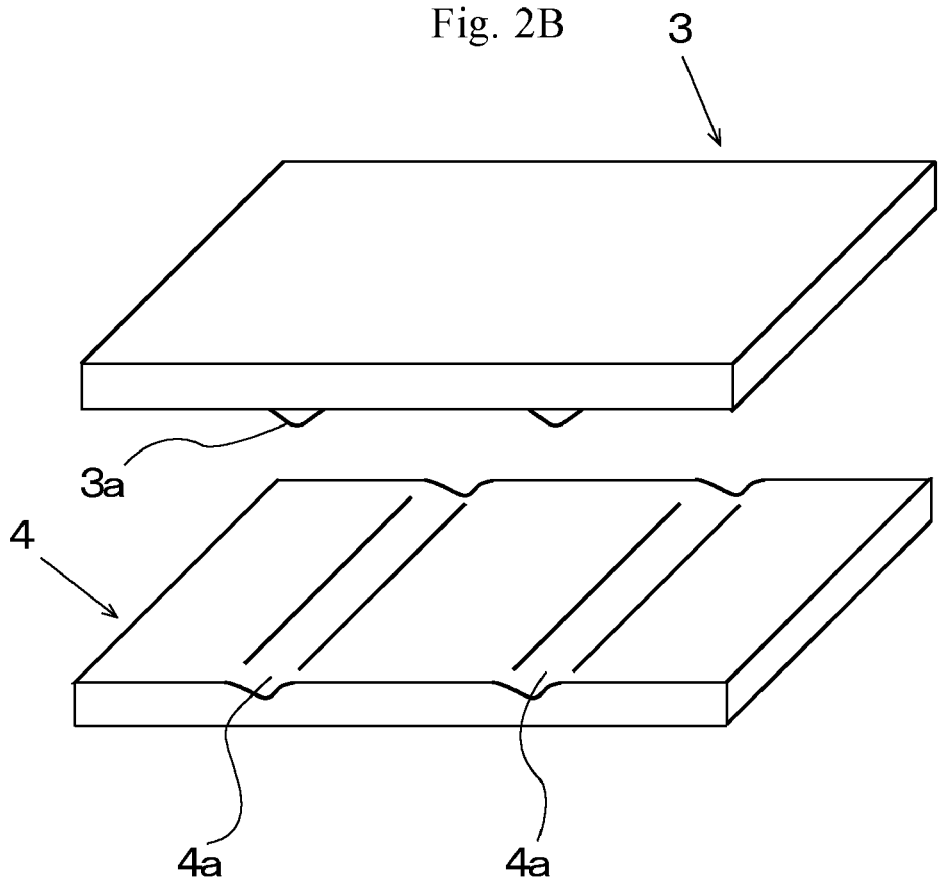

FIGS. 2A and 2B are schematic illustrations of holding members that can be used for the embodiment of stacked battery of FIGS. 1A through 1C.

The holding members illustrated in FIG. 2A include a projecting holding member 3 having projecting sections to be engaged respectively with the recessed sections of the uppermost negative electrode arranged closest to the exposed top surface of the stacked battery by way of a separator. Note that the projecting holding member 3 is in fact provided as two projecting sections 3a that are independent from each other.

The recessed holding member 4 has recessed sections to be engaged respectively with the projecting sections of the lowermost negative electrode arranged closest to the exposed bottom surface of the stacked body by way of a separator. The recessed holding member 4 is prepared by forming recessed sections 4a to be engaged with the projecting sections of the lowermost negative electrode on the upper surface of a plate having a surface area substantially equal to the surface area of a horizontal plane of projection of the electrode shown in FIG. 1C.

The projecting holding member 3 illustrated in FIG. 2B is prepared by forming projecting sections 3a to be engaged with the recessed sections of the uppermost negative electrode on the lower surface of a plate having a surface area substantially equal to the area of a horizontal plane of projection of the electrode shown in FIG. 1C.

When the projecting holding member is in fact provided as two projecting sections that are independent from each other as shown in FIG. 2A, the projecting sections 3a are preferably made to hold the stacked body of the stacked battery by being pressed into the respective corresponding recessed sections of the uppermost negative electrode of the stacked body of the stacked battery by the film casing due to the pressure difference between the inside and the outside thereof, where the atmospheric pressure prevails.

The holding members can be manufactured by molding a synthetic resin material that is highly resistive against corrosion in electrolytic solutions such as polyethylene, polypropylene or polyethylene terephthalate. They may be hollow or solid.

Figure 3A:
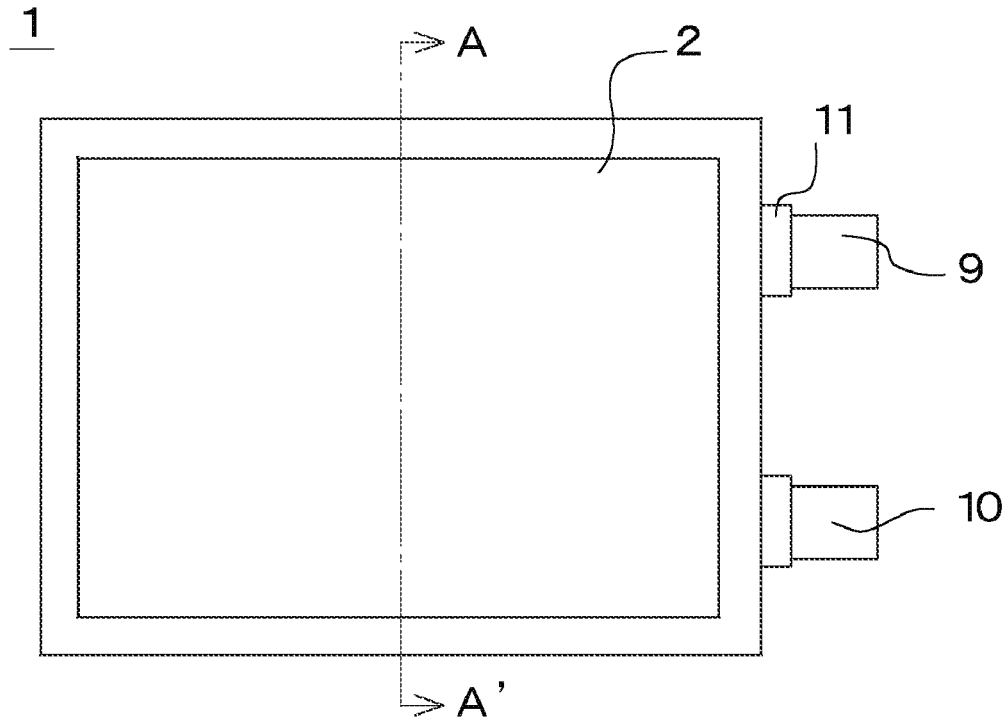
FIGS. 3A, 3B and 3C are schematic illustrations of another embodiment of stacked battery according to the present invention.
Figure 3B:
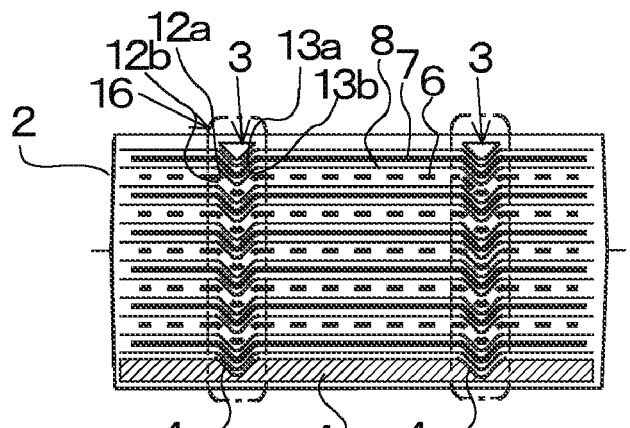
Figure 3C:
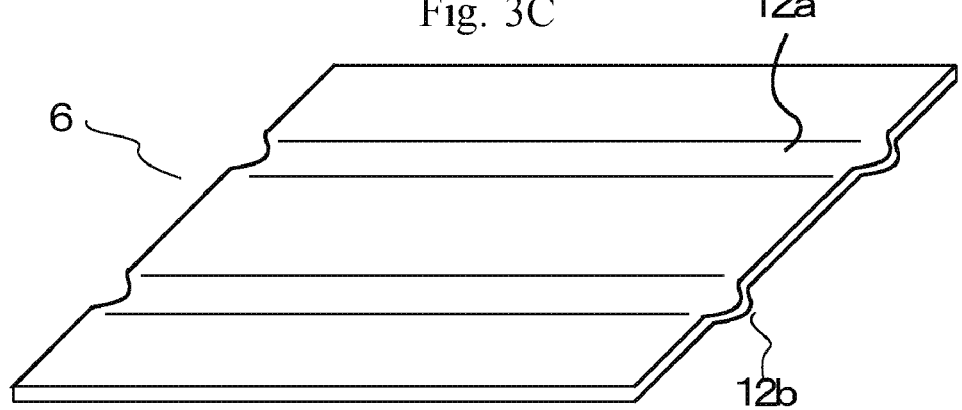

FIGS. 3A, 3B and 3C are schematic illustrations of another embodiment of stacked battery according to the present invention.

FIG. 3A is a schematic plan view of the stacked battery and FIG. 3B is a schematic cross sectional view taken along line A-A' in FIG. 3A, showing the thickness with an enlarged scale. FIG. 3C is a schematic perspective view of a positive electrode of the stacked body of the stacked battery.

The stacked battery 1 is formed by laying positive electrodes 6 and negative electrodes 8 alternately one on the other by way of separators 7. The recessed sections 12a formed on a positive electrode 6 are aligned with the respective projecting sections 13b formed on the negative electrode 8 that is laid on the positive electrode 6 by way of a separator 7. Similarly, the projecting sections 12b formed on a positive electrode 6 are aligned with the respective recessed sections 13a formed on a negative electrode 8 laid under the positive electrode 6 by way of another separator 7. The recessed sections and the projecting sections are produced by forming grooves extending in the direction perpendicular to the side of the stacked body from which the electrodes are led out and connected to the electrode terminals. In other words, the recessed sections and the projecting sections extend in the longitudinal direction of the electrodes of the battery.

The negative electrodes 8 that are arranged at the opposite ends of the stacked body 15 so as to be closest to the respective exposed surfaces are also provided with recessed sections and projecting sections. A projecting holding member 3 to be engaged with the recessed sections of the uppermost negative electrode 8 by way of a separator 7 operates as holding sections 16 along with the recessed holding member 4 to be engaged with the projecting sections of the lowermost negative electrode 8 by way of a separator 7.

Figure 4A:
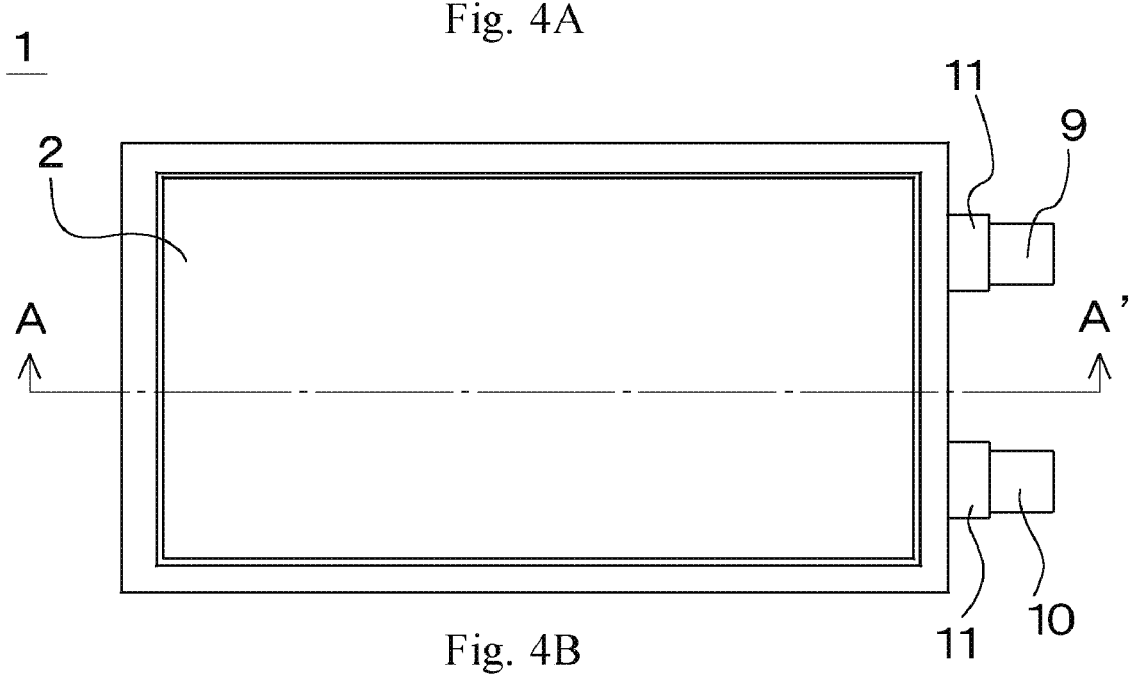
FIGS. 4A, 4B and 4C are schematic illustrations of still another embodiment of stacked battery according to the present invention.
Figure 4B:
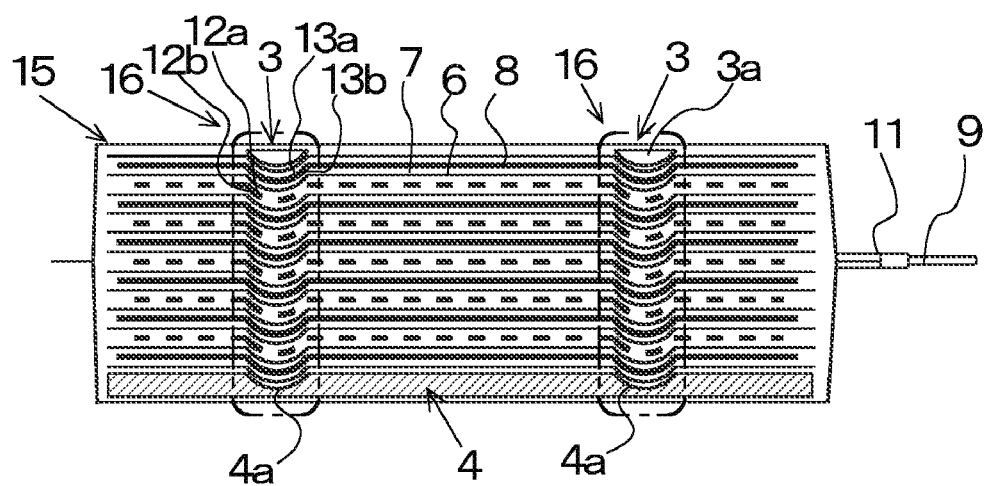
Figure 4C:
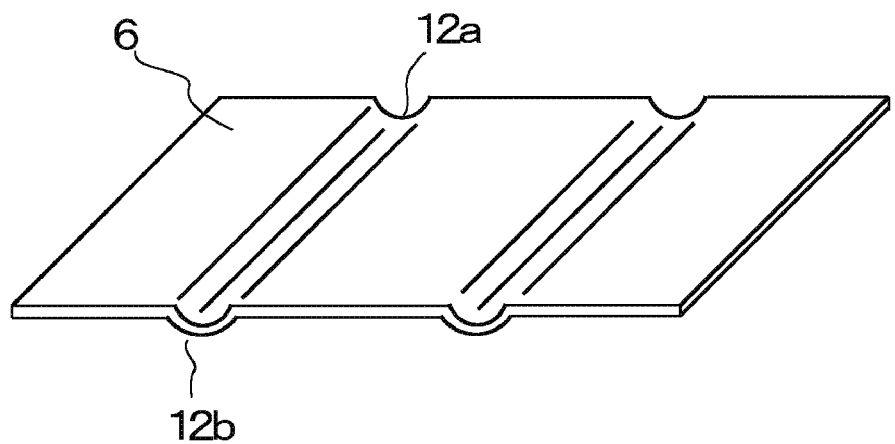

FIGS. 4A, 4B and 4C are schematic illustrations of still another embodiment of stacked battery according to the present invention.

FIG. 4A is a schematic plan view of the stacked battery and FIG. 4B is a schematic cross sectional view taken along line A-A' in FIG. 4A, showing the thickness with an enlarged scale. FIG. 4C is a schematic perspective view of a positive electrode of the stacked body of the stacked battery.

The stacked battery illustrated in FIGS. 4A through 4C differs from the stacked battery illustrated in FIGS. 1A through 1C and the stacked battery illustrated in FIGS. 3A through 3C in that the grooves for producing recessed sections and projecting sections of the stacked battery of FIGS. 4A through 4C show a semicircular cross section while the grooves for producing recessed sections and projecting sections of both the stacked battery of FIGS. 1A through 1C and that of FIGS. 3A through 3C show a V-shaped cross section.

Since the cross section is semicircular, the active substance layers on the bottoms of the recessed sections and those on the ridges of the projecting sections remain stable.

Figure 5A:
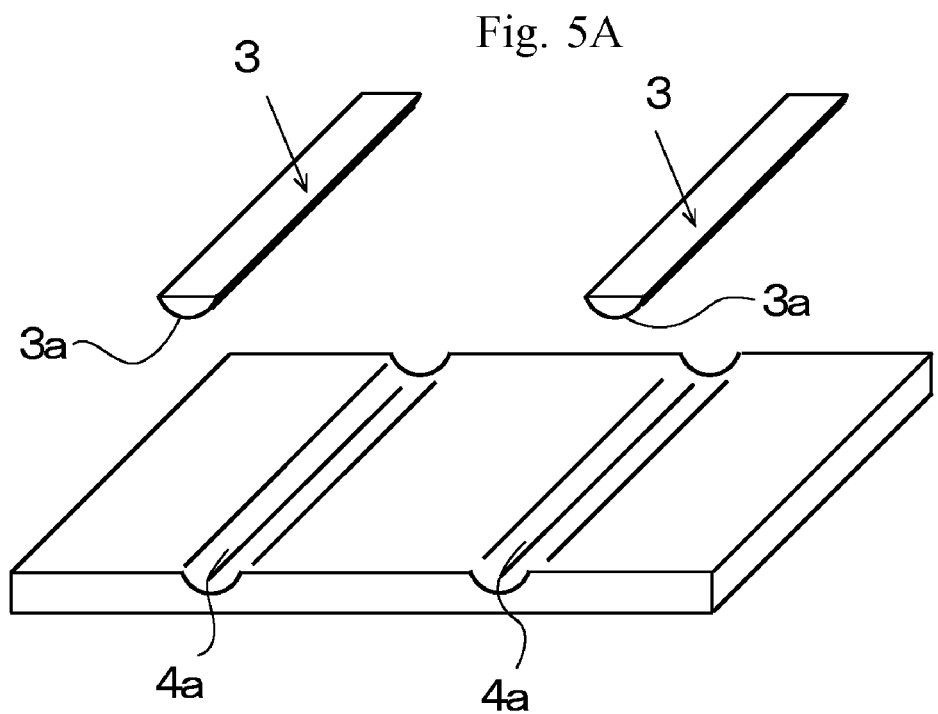
FIGS. 5A and 5B are schematic illustration of holding members that can be used for the embodiment of stacked battery of FIGS. 4A through 4C.
Figure 5B:
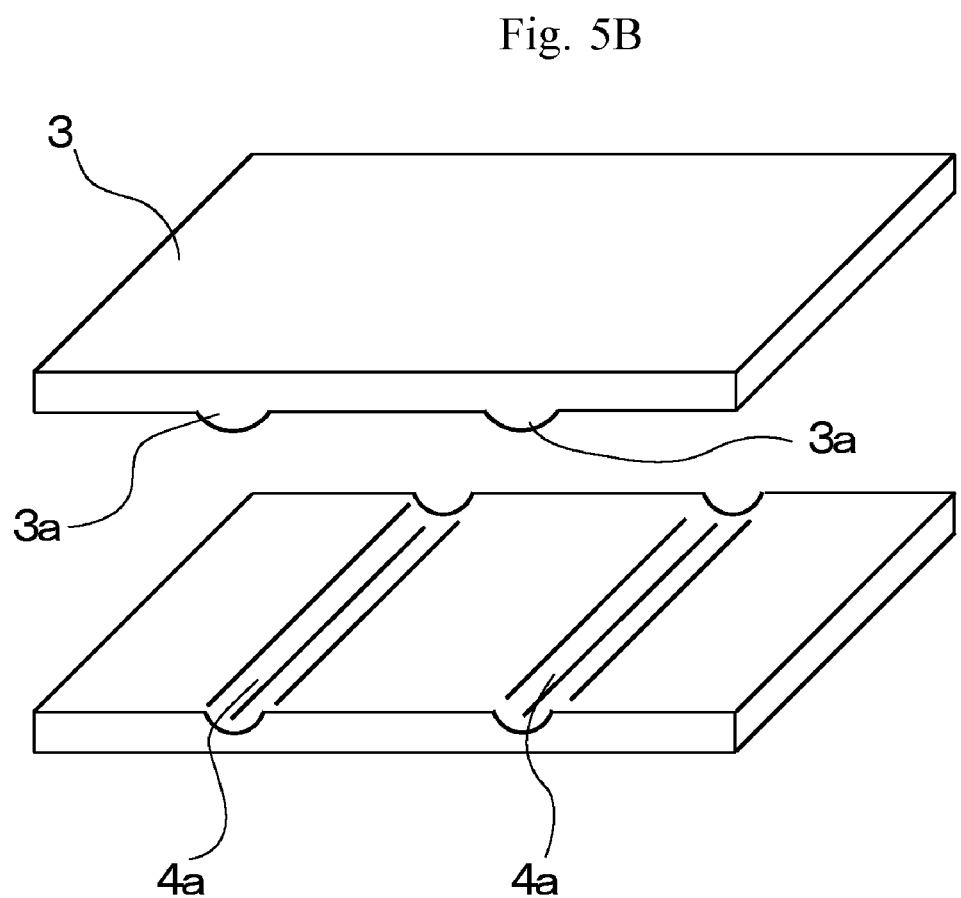

FIGS. 5A and 5B are schematic illustrations of holding members that can be used for the embodiment of stacked battery of FIGS. 4A through 4C.

The holding members illustrated in FIG. 5A include a projecting holding member 3 having projecting sections showing a semicircular cross section that are to be engaged respectively with the recessed sections of the uppermost negative electrode arranged closest to the exposed top surface of the stacked battery. Note that the projecting holding member 3 is in fact provided as two projecting sections 3a that show a semicircular cross section and are independent from each other.

The recessed holding member 4 has recessed sections to be engaged respectively with the projecting sections of the lowermost negative electrode arranged closest to the exposed bottom surface of the stacked body by way of a separator. The recessed holding member 4 is prepared by forming recessed sections 4a showing a semicircular cross section on the upper surface of a plate having a surface area substantially equal to the surface area of the stacked body of the battery.

The projecting holding member 3 illustrated in FIG. 5B is prepared by forming projecting sections 3a showing a semicircular cross section that are to be engaged with the recessed sections of the uppermost negative electrode on the lower surface of a plate having a surface area substantially equal to the surface area of the stacked body of the battery.

When the projecting holding member is in fact provided as two projecting sections that are independent from each other as shown in FIG. 5A, the projecting sections 3a are preferably made to hold the stacked body of the stacked battery by being pressed into the respective corresponding recessed sections of the uppermost negative electrode of the stacked body of the stacked battery by the film casing due to the pressure difference between the inside and the outside thereof, where the atmospheric pressure prevails.

Figure 6A:
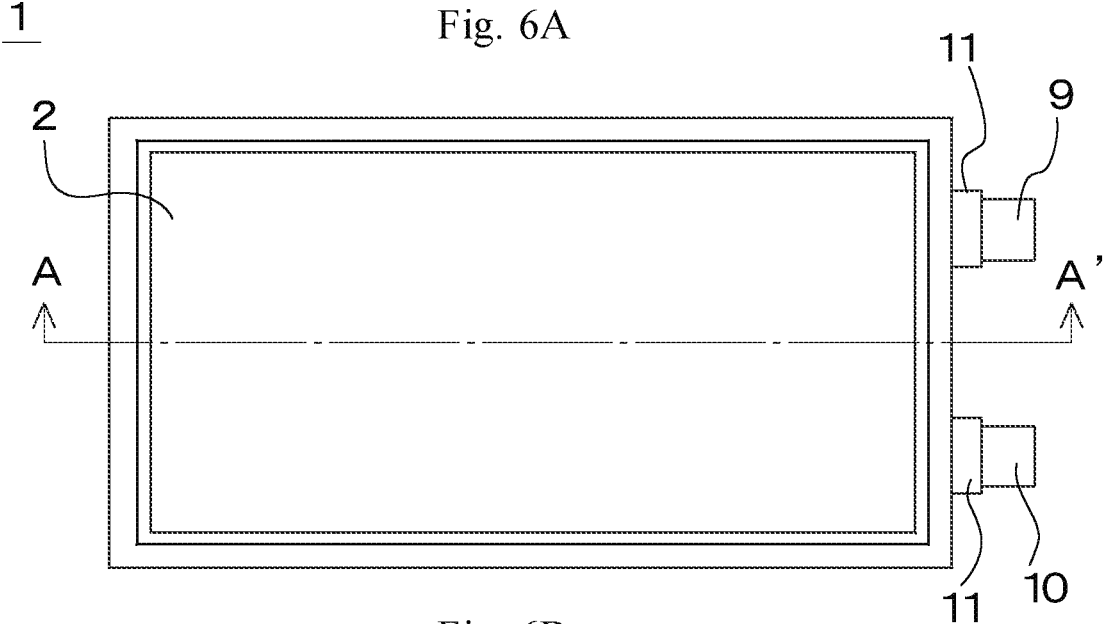
FIGS. 6A, 6B and 6C are schematic illustrations of still another embodiment of stacked battery according to the present invention.
Figure 6B:
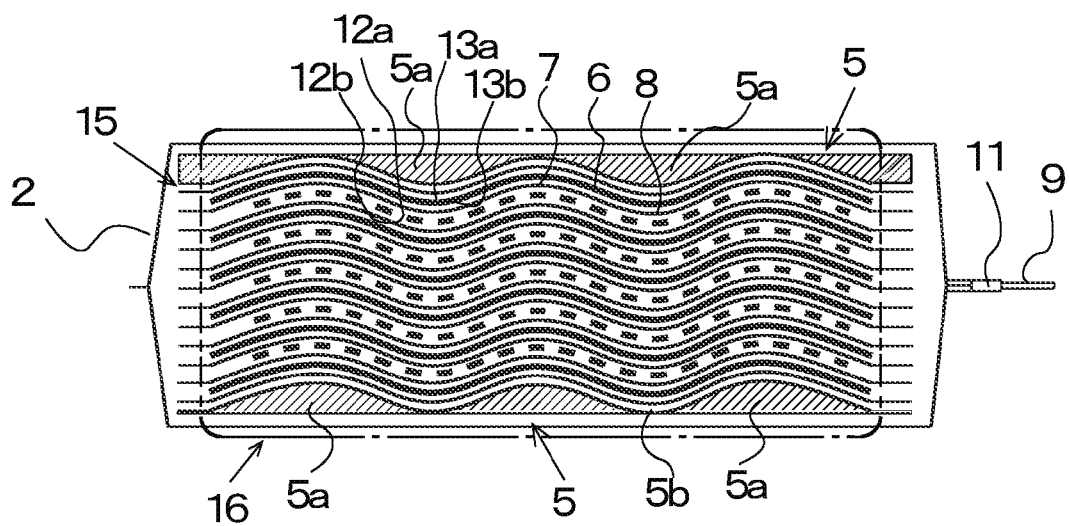
Figure 6C:
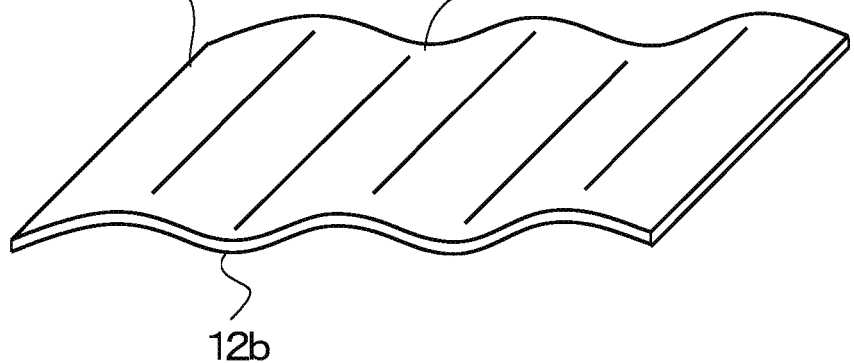

FIGS. 6A, 6B and 6C are schematic illustrations of still another embodiment of stacked battery according to the present invention.

FIG. 6A is a schematic plan view of the stacked battery and FIG. 6B is a schematic cross sectional view taken along line A-A' in FIG. 6A, showing the thickness with an enlarged scale. FIG. 6C is a schematic perspective view of a positive electrode of the stacked body of the stacked battery.

The stacked battery 1 is formed by laying positive electrodes 6 and negative electrodes 8 alternately one on the other by way of separators 7. The recessed sections 12a formed on a corrugated positive electrode 6 are aligned with the respective projecting sections 13b formed on the corrugated negative electrode 8 that is laid on the positive electrode 6 by way of a separator 7. Similarly, the projecting sections 12b formed on a corrugated positive electrode 6 are aligned with the respective recessed sections 13a formed on a corrugated negative electrode 8 laid under the positive electrode 6 by way of another separator 7. Thus, the recessed sections and the projecting sections of the corrugated electrodes appear as if they were waves moving toward the side of the stacked body from which the electrodes are led out and connected to the electrode terminals.

The negative electrodes 8 that are arranged near the opposite ends of the stacked body 15 so as to be closest to the respective exposed surfaces are also provided with recessed sections and projecting sections to form undulations.

Corrugated holding members 5 are arranged on the respective opposite surfaces of the stacked body 15 such that the recessed sections 13a of the uppermost and lowermost negative electrodes 8 are engaged with the projecting sections 5a of the corrugated holding members 5 and the projecting sections 13b of the uppermost and lowermost negative electrodes 8 are engaged with the recessed sections 5b of the corrugated holding members 5. A holding section 16 is formed to entirely cover the positive electrodes 6 and the negative electrodes 8. Like the other embodiments, this embodiment can prevent the stacked body 15 from repeatedly colliding with the film casing by means of this arrangement.

FIG. 7 is a schematic illustration of holding members that can be used for the embodiment of stacked battery of FIGS. 6A through 6C.

The corrugated holding members 5 are corrugated plates having a surface area substantially equal to the surface area of a horizontal projection of each of the electrodes and provided with projecting sections 5a and the recessed sections 5b to be engaged respectively with the respective recessed sections and the projecting sections formed on the uppermost negative electrode and those formed on the lowermost negative electrode of the stacked body. Thus, the corrugated holding members having recessed sections and projecting sections can hold the entire stacked body.

Figure 8A:
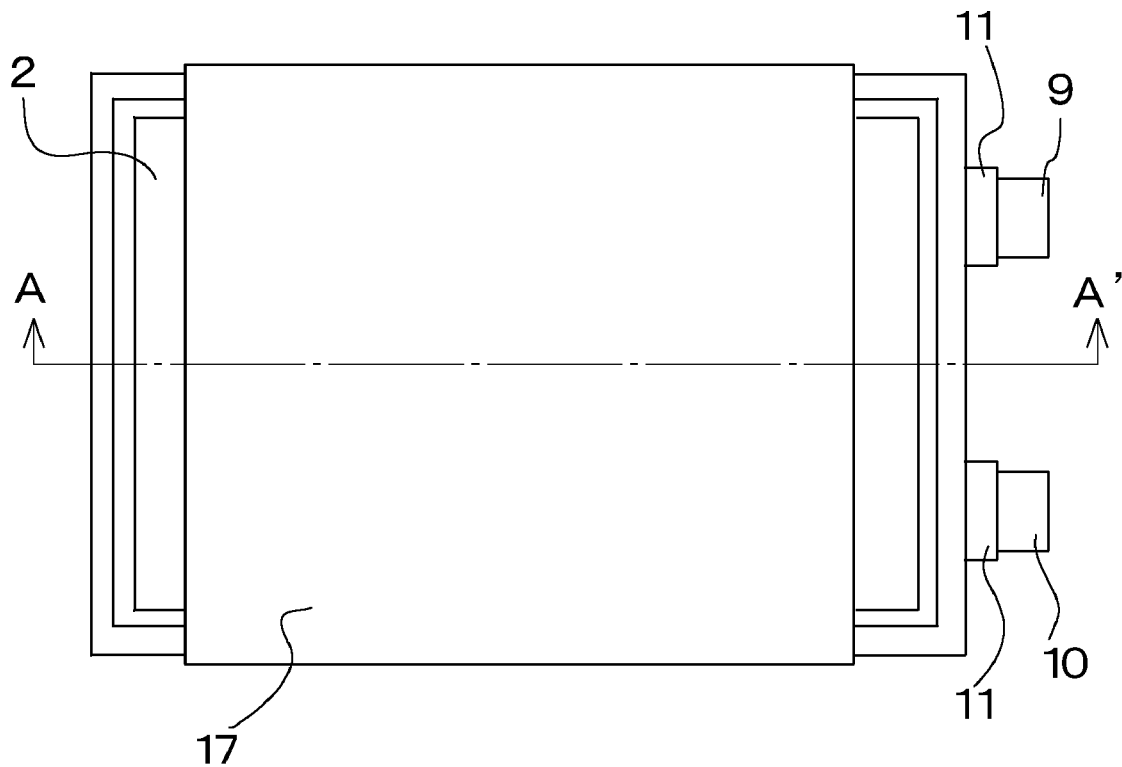
FIGS. 8A and 8B are schematic illustrations of still another embodiment of stacked battery according to the present invention.
Figure 8B:
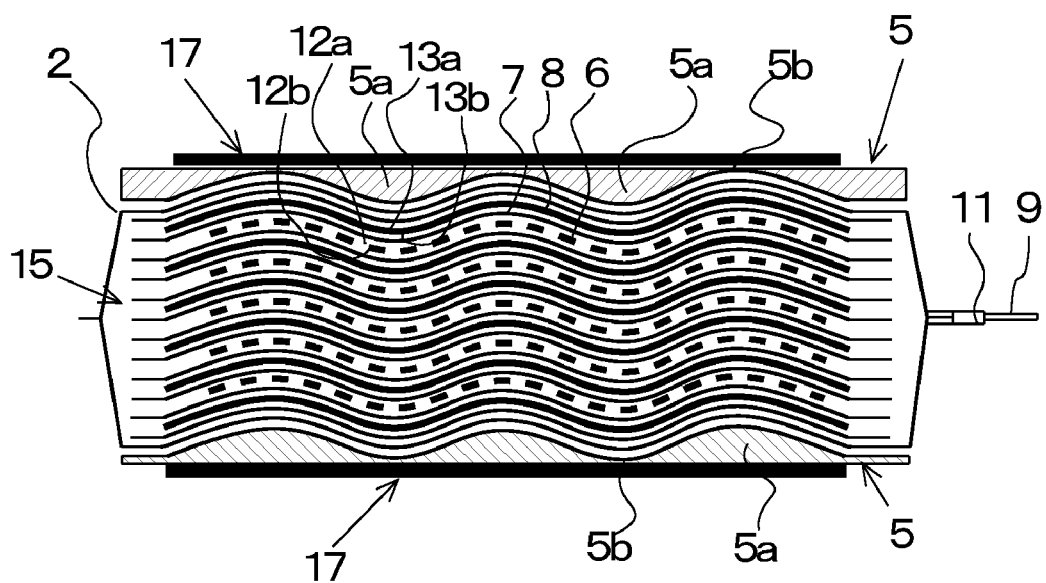

The stacked battery shown in FIGS. 8A through 8C is formed by holding the stacked body 15 by means of corrugated holding members 5, which are arranged respectively on the uppermost negative electrode 8 and the lowermost negative electrode 8 so as to run in parallel with the surfaces of those negative electrodes 8 and engaged with the recessed sections and the projecting sections of those negative electrodes 8.

On the other hand, corrugated positive electrodes 6 and corrugated negative electrodes 8 having recessed sections and projecting sections are alternately laid one on the other by way of separators and then covered and sealed by a film casing 2. Subsequently, corrugated holding members 5 are arranged respectively on the top surface and on the bottom surface of the stacked body such that the projecting sections 5a and the recessed sections 5b of the top corrugated holding member 5 are engaged respectively with the recessed sections and the projecting sections of the uppermost negative electrode 6 of the stacked body by the film casing 2, while the projecting sections 5a and the recessed sections 5b of the bottom corrugated holding member 5 are engaged respectively with the recessed sections and the projecting sections of the lowermost negative electrode 6 of the stacked body by the film casing 2. Then, the corrugated holding members 5 at the opposite ends are rigidly secured by securing means 17.

Since the corrugated holding members 5 are arranged on the outer surface of the film casing 2 of the stacked battery of this embodiment, the corrugated holding members can be made of a metal material or some other material that cannot be employed in the inside of a battery.

The securing means 17 may be an adhesive agent, an adhesive tape, a removable securing means or some other appropriate means.

FIGS. 9A, 9B, 9C, 9D and 9E are schematic illustrations of positive electrodes that can be used for the purpose of the present invention.

The recessed sections and the projecting sections formed on the positive electrodes and the negative electrodes of the stacked batteries of the embodiments described above by referring to FIGS. 1A through 1C, FIGS. 3A through 3C, FIGS. 4A through 4C, FIGS. 6A through 6C and FIGS. 8A and 8B are made to extend along the entire longitudinal edges or the entire transversal edges of the positive electrodes and the negative electrodes and show a V-shaped, a semicircular or some other similar cross section or a corrugated cross section. The positive electrodes and negative electrodes illustrated in FIGS. 9A through 9E have a totally different profile.

Figure 9A:
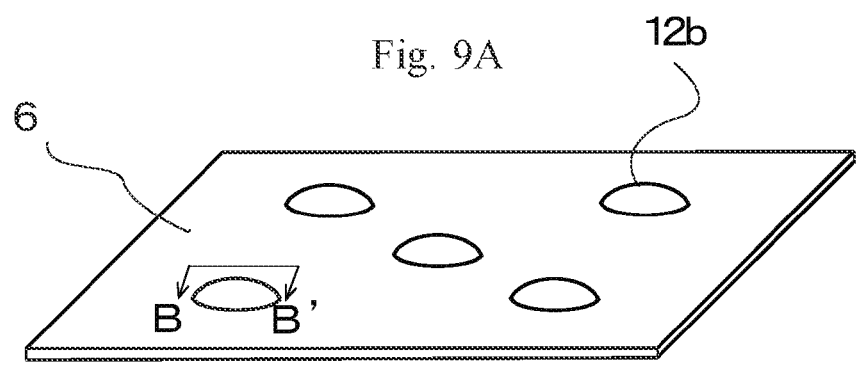
FIGS. 9A, 9B, 9C, 9D and 9E are schematic illustrations of positive and negative electrodes that can be used for the purpose of the present invention.
Figure 9B:
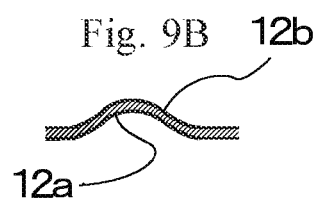

The positive electrode 6 shown in FIG. 9A has recessed sections 12a and projecting sections 12b that show a curved profile such as a semispherical profile as illustrated in FIG. 9B, which is a cross sectional view of a projecting section taken along line B-B' in FIG. 9A. The recessed sections 12a and the projecting sections 12b are arranged on the electrode at intervals.

Figure 9C:
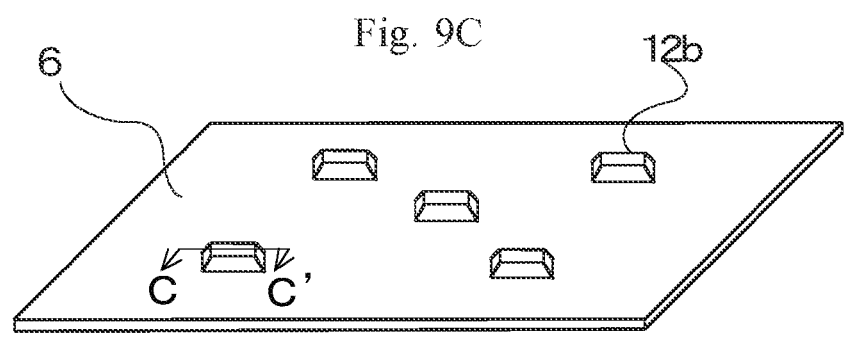
Figure 9D:
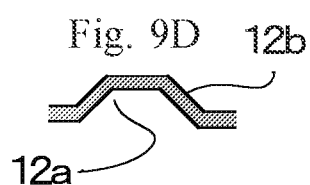

The electrode 6 shown in FIG. 9C has recessed sections 12a and projecting sections 12b that show a frusto-conical profile as illustrated in FIG. 9D, which is a cross sectional view of a projecting section taken along line C-C' in FIG. 9C. The recessed sections 12a and the projecting sections 12b are arranged on the electrode at intervals.

Figure 9E:
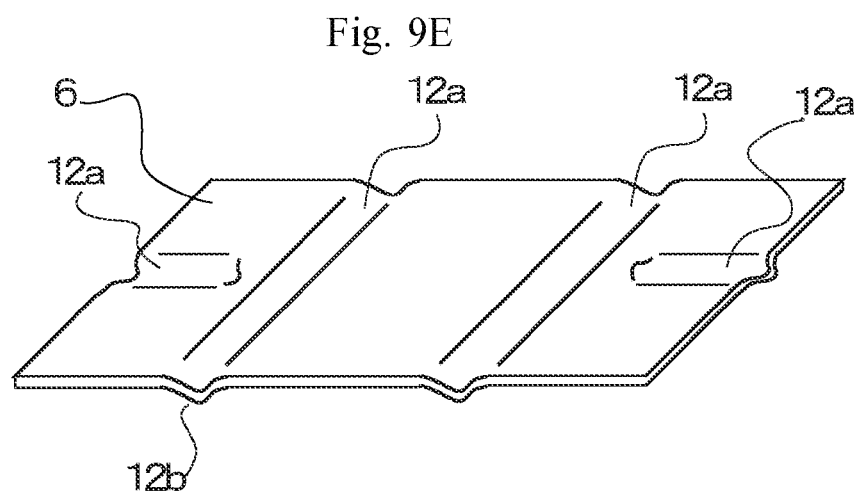
Figure 10A:
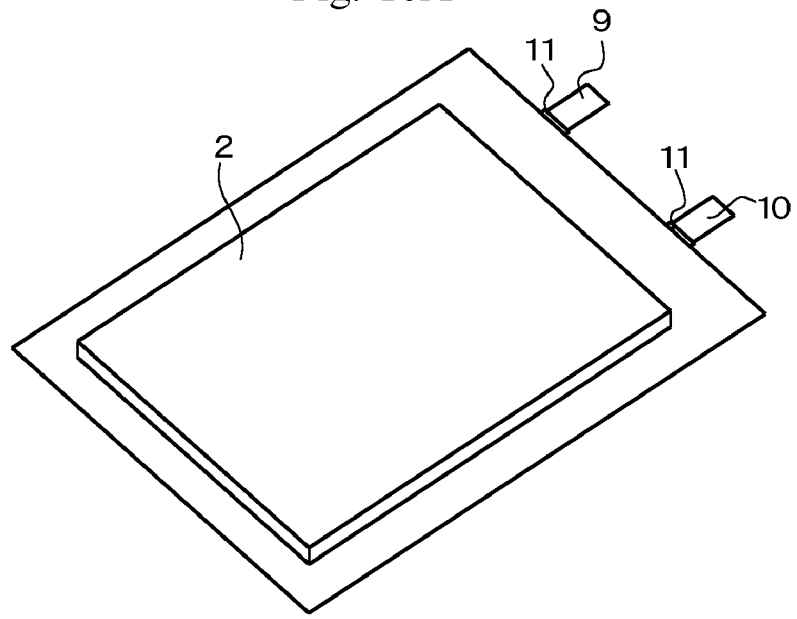
FIGS. 10A, 10B and 10C are schematic illustrations of an example of a stacked battery sealed by a film casing.
Figure 10B:
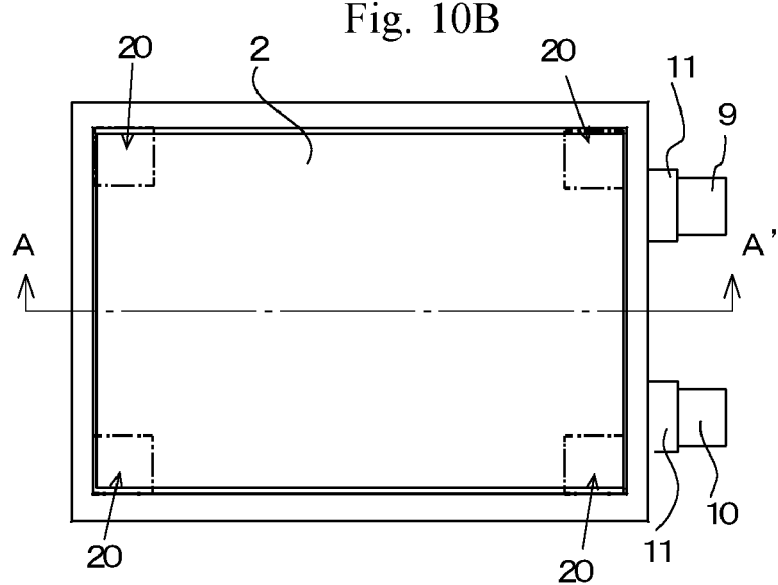
Figure 10C:
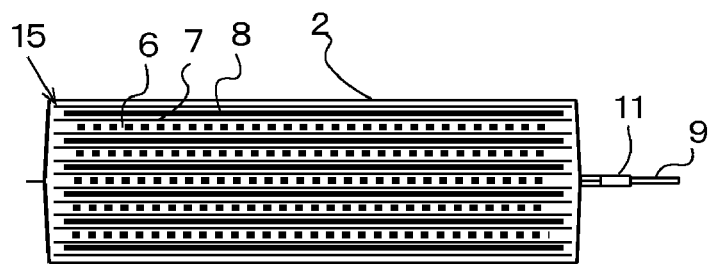

FIG. 9E shows an electrode having recessed sections 12a that run in parallel with a pair of opposite sides of the electrode and recessed sections 12b that run orthogonally relative to the recessed sections 12a are arranged with intervals. Since the electrode has recessed sections that run in two directions, it provides a remarkable effect of preventing the stacked body from moving.

Thus, while it has been a general idea that, in a stacked battery having a battery element of a stacked body formed by alternately laying plate-like positive electrodes and plate-like negative electrodes one on the other, highly flat positive electrodes and highly flat negative electrode are preferably employed. To the contrary, according to the present invention, recessed sections and projecting sections are formed on the surfaces of the positive electrodes and the negative electrodes where a battery reaction takes place. Then, the positive electrodes and the negative electrodes are laid alternately one on the other by way of separators with the recessed sections of a positive electrode arranged respectively vis-a-vis the projecting sections of an adjacent negative electrode, and holding members are fitted into the recessed sections and the projecting sections of the uppermost electrode and the lowermost electrode to provide a stacked battery that operates excellently and is prevented from being damaged if the stacked body is repeatedly brought into contact with the film casing.

Now, a stacked battery according to the present invention will be described further in terms of a lithium ion battery.

A complex oxide selected from lithium-manganese complex oxide, lithium-cobalt complex oxide and lithium-nickel complex oxide may be used as active substance for the positive electrodes of the battery.

A plurality of lithium transition metal complex oxides may be compounded for the purpose of the present invention. For example, $LiMn_2O_4$ may be employed as lithium manganese oxide, with which lithium-nickel oxide $LiNiO_2$ may be mixed. With such an arrangement, the charge/discharge capacity of the stacked battery can be increased if compared with a stacked battery formed by using only a lithium manganese oxide. An example of compounding ratio of lithium manganese oxide : lithium nickel oxide will be 80 to 90 :20 to 10 in terms of mass ratio.

A positive electrode having a positive electrode active substance layer thereon that can be used for the purpose of the present invention can be prepared by applying a slurry prepared by mixing a positive electrode active substance as described above with an electric conductibility providing material such as acetylene black, a bonding agent such as polyvinylidene fluoride and a dispersive medium such as N-methyl-2-pyrrolidone onto a collector, which may typically be an aluminum foil, by using a doctor blade and heating and drying the slurry.

A negative electrode having a negative electrode active layer thereon that can be used for the purpose of the present invention can be prepared by applying a slurry prepared by mixing a carbon material such as graphite with an electric conductibility providing material such as acetylene black, a bonding agent such as polyvinylidene fluoride and a dispersive medium such as N-methyl-2-pyrrolidone onto a collector, which may typically be a copper foil, by using a doctor blade and heating and drying the slurry.

The positive electrodes and the negative electrodes prepared in the above-described manner are then laid alternately one on the other by way of separators and a mixed solution of EC (ethylene carbonate) and DEC (diethyl carbonate) where a lithium salt such as $LiPF_6$ is dissolved can be used as an electrolytic solution.

EXAMPLE 1

Preparation of Positive Electrodes

A slurry containing 50 mass portions of lithium manganese complex oxide ($LiMn_2O_4$), 2.5 mass portions of acetylene black having an average particle size of 10 micrometer, 2.5 mass portions of polyvinylidene fluoride and 45 mass portions of N-methyl-2-pyrrolidone was prepared.

The prepared slurry was then applied intermittently onto aluminum foils, which were to be operated as collectors, having a thickness of 20 micrometer and a width of 550 mm to form transversal stripes of the slurry extending all the way from side to side and having a length of 150 mm, the stripes being separated from each other by a gap of 30 mm. Electrode drawing out terminals that were 13 mm wide and 40 mm long were formed in the unapplied parts of each of the aluminum foils to produce positive electrodes with the stripes of the applied slurry that was 60 mm wide and 130 mm long.

Then, two straight recessed sections showing a cross section of a 3 mm high regular triangle, where the cross section of the vertex of the triangle, or the V-shape, has a radius of curvature of 3 mm, are formed across each entire positive electrode so as to run orthogonally relative to the side where the electrode terminals are fitted at positions separated from the center of the positive electrode by 30 mm and 50 mm respectively.

Preparation of Negative Electrodes

A slurry prepared by compounding graphite, acetylene black that operates as an electric conductibility providing material and polyvinylidene fluoride that operates as binder to a ratio (mass ratio) of graphite:acetylene black:polyvinylidene fluoride=94:1:5 and dispersing the mixture into N-methyl-2-pyrrolidone (NMP) was prepared.

The prepared slurry was then applied intermittently onto copper foils, which were to be operated as collectors, having a thickness of 10 micrometer and a width of 550 mm to form transversal stripes of the slurry extending all the way from side to side and having a length of 150 mm, the stripes being separated from each other by a gap of 30 mm. The applied slurry was then dried and pressed to produce a 100 micrometer thick negative electrode active substance layer on each of the copper foils.

Tabs made of nickel for collecting electricity were welded to the unapplied areas of each of the copper foils.

Then, two straight projecting sections showing a cross section of a 3 mm high regular triangle, where the cross section of the vertex of the triangle, or the V-shape, shows a radius of curvature of 3 mm, are formed across each entire negative electrode by hot press molding so as to run orthogonally relative to the side where the electrode terminals are fitted at positions separated from the center of the negative electrode by 40 mm.

Assemblage of Battery

Nine positive electrodes and 10 negative electrodes are alternately laid one on the other by way of separators made of propylene so as to make each recessed section receive a projecting section of the opposite polarity. Separators are respectively arranged also on the top surface and the bottom surface running in parallel with the layers of the stacked body. Then, a holding member having recessed sections and a holding member having projecting sections are arranged so as to be engaged respectively with the negative electrode having exposed projecting sections and the negative electrode having exposed recessed sections.

Thereafter, the work was contained in a container formed by a 150 micrometer thick film casing of nylon/aluminum/polypropylene and a mixture solution of ethylene carbonate (EC) and diethyl carbonate (DEC) (volume ratio=30:70), in which $LiPF_6$ was dissolved to show a concentration of 1M, was injected into the container. Subsequently, only the aluminum tabs and the nickel tabs for leading out electric currents were taken out to the outside and the container of the film casing was sealed at the opening thereof by heat sealing except a part thereof. Finally, the internal pressure of the battery covered by the film casing was reduced and the container of the film casing was completely sealed by heat sealing.

Vibration Test

Five prepared lithium ion secondary batteries were subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 10 G. No liquid leakage was observed in the samples.

EXAMPLE 2

A lithium ion secondary battery was prepared as in Example 1 except that two straight recessed sections showing a cross section of a 3 mm high regular triangle, where the cross section of the vertex of the triangle, or the V-shape, had a radius of curvature of 3 mm, were formed across each entire positive electrode and each entire negative electrode so as to run perpendicularly relative to the side where the electrode terminals were fitted at positions separated from the center of the electrode by 40 mm in the stacked body as shown in FIG. 3. Then, a holding member having recessed sections and a holding member having projecting sections were arranged so as to be engaged respectively with the negative electrode having exposed projecting sections and the negative electrode having exposed recessed sections.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 10 G. No liquid leakage was observed in the samples.

EXAMPLE 3

A lithium ion secondary battery was prepared as in Example 1 except that two straight recessed sections showing a cross section of a 3 mm high semicircle, where the cross section of the vertex of the semicircle had a radius of curvature of 5 mm, were formed across each entire positive electrode and each entire negative electrode by thermal press molding so as to run in parallel with the side where the electrode terminals were fitted at positions separated from the center of the electrode by 40 mm in the stacked body as shown in FIG. 4. Then, a holding member having recessed sections and a holding member having projecting sections were arranged so as to be engaged respectively with the negative electrode having exposed projecting sections and the negative electrode having exposed recessed sections.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 10 G. No liquid leakage was observed in the samples.

EXAMPLE 4

Negative electrodes and positive electrodes were formed by thermal press molding as so many corrugated plates where the ridges and the grooves run orthogonally relative to the side where the electrode terminals were led out as shown in FIG. 6. The cross section of the corrugated plates showed a height of 6 mm, a radius of curvature of 3 mm at the ridges and the bottoms of waves and a pitch of arrangement of 6 mm.

Then, as in Example 1, the positive electrodes and the negative electrodes were alternately laid one on the other by way of separators to form a stacked body of battery elements. Subsequently, a holding member having a corrugated surface that exactly engaged with the exposed corrugated surface of the uppermost negative electrode and a holding member having a corrugated surface that exactly engaged with the exposed corrugated surface of the lowermost negative electrode, the holding members having a surface area substantially equal to the surface area of a projection of each of the electrodes, were arranged respectively on the top surface and the bottom surface of the stacked body. Then, only the aluminum tabs and the nickel tabs for leading out electric currents were taken out to the outside and the container of the film casing was sealed at the opening thereof by heat sealing except a part thereof. Finally, the internal pressure of the battery covered by the film casing was reduced and the container of the film casing was completely sealed by heat sealing.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 11 G. No liquid leakage was observed in the samples.

EXAMPLE 5

Negative electrodes and positive electrodes were formed by thermal press molding as so many corrugated plates where the ridges and the grooves run orthogonally relative to the side where the electrode terminals were fitted as shown in FIG. 8. The cross section of the corrugated plates showed a height of 6 mm, a radius of curvature of 3 mm at the ridges and the bottoms of waves and a pitch of arrangement of 6 mm.

Then, as in Example 1, the positive electrodes and the negative electrodes were alternately laid one on the other by way of separators to form a stacked body of battery elements. Then, only the aluminum tabs and the nickel tabs for leading out electric currents were taken out to the outside and the container of the film casing was sealed at the opening thereof by heat sealing except a part thereof. Subsequently, the internal pressure of the battery covered by the film casing was reduced and the container of the film casing was completely sealed by heat sealing.

Thereafter, a holding member having a corrugated surface that exactly engaged with the corrugated upper surface of the uppermost negative electrode and a holding member having a corrugated surface that exactly engaged with the exposed corrugated lower surface of the lowermost negative electrode, the holding members being made of polyethylene terephthalate resin and having a surface area substantially equal to the surface area of a horizontal projection of each of the electrodes, were arranged respectively on the top surface and the bottom surface of the stacked body by the film casing. Finally, the stacked body sealed by the film casing and the holding members on the opposite surfaces of the stacked body were bonded together by means of an adhesive tape.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 11 G. No liquid leakage was observed in the samples.

EXAMPLE 6

A lithium ion secondary battery was prepared as in Example 1 except that the lithium manganese oxide ($LiMn_2O_4$), which was the positive electrode active substance, used in Example 1 was replaced by a mixture of 85 mass portions of lithium manganese oxide and 15 mass portions lithium nickel oxide and a mixture solution of ethylene carbonate (EC) and diethyl carbonate (DEC) (volume ratio=24:76), in which $LiPF_6$ was dissolved to show a concentration of 1M, was injected.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, application of vibrations for 20 hours in each of the three directions and an acceleration of 10 G. No liquid leakage was observed in the samples.

COMPARATIVE EXAMPLE 1

A stacked battery was prepared as in Example 1 except that flat positive electrodes and flat negative electrodes having neither recesses nor projections were laid one on the other.

Subsequently, five prepared lithium ion secondary batteries were then subjected as samples to a vibration test conforming to the related provisions of the Automobile Parts Vibration Test Method JIS D1601 with a frequency range of 20 to 400 Hz, a sweep time of 10 minutes, and an acceleration of 8 G. Liquid leakage was observed in some of the samples.

According to the present invention, either recessed sections or projecting sections are formed on one of the surfaces where a battery reaction takes place of each of the plate-like positive electrodes and the plate-like negative electrodes and either projecting sections or recessed sections, whichever appropriate, are formed on the opposite surface of the electrode. Then, a stacked body formed by alternately laying the positive electrodes and negative electrodes one on the other by way of separators and sealed by a film casing. Thus, the film casing of a stacked battery according to the present invention is prevented from being damaged if repeatedly subjected to vibrations and hence can broadly find applications in the field of domestic electric appliances including electric tools and vacuum cleaners in addition to applications in automobiles.

What is claimed is:

1. A stacked battery comprising:
a stacked body formed by alternately laying plate-shape positive electrodes and plate-shape negative electrodes one on the other by way of separators;
each of the positive electrodes and the negative electrodes having recessed sections and corresponding projecting sections on a battery active surface thereof;
the recessed sections of each electrode being disposed in the projecting sections of one of the adjacent electrodes of the opposite polarity by way of a separator, except those arranged closest to the exposed surfaces of the stacked battery, and the projecting sections of each electrode being disposed in the recessed sections of the other adjacent electrode of the opposite polarity by way of a separator; and
holding members respectively engaged directly or through at least either a separator and a film casing with the recessed sections and the projecting sections of the electrodes arranged closest to the exposed surfaces;
the holding members being formed as rod-shaped members or plate-shaped members and rigidly secured to the film casing covering the stacked body and sealing the stacked body;
the positive electrodes and the negative electrodes being respectively connected to a positive terminal and a negative terminal.

2. The stacked battery according to claim 1, wherein the holding members have a profile that makes the holding members snugly engaged with the recessed sections or the projecting sections.

3. The stacked battery according to claim 1 or 2, wherein the holding members are arranged inside the film casing and pressed by the film casing due to the pressure difference acting on the inner and outer surfaces of the film casing.

4. The stacked battery according to claim 1 or 2, wherein the holding members are arranged outside the film casing and secured to the film casing by an adhesive agent, adhesive tapes or removable securing means.

5. The stacked battery according to claim 1, wherein the recessed sections and the projecting sections comprises at least one groove-type selected from a v-shaped, a semicircular, a corrugated cross section, a semispherical, a frusto-conical profile or a combination thereof.

6. The stacked battery according to claim 1, wherein the holding members extends to cover the entire positive electrodes.

7. The stacked battery according to claim 1, wherein the holding members extends to cover the entire negative electrodes of the stacked battery.

8. The stacked battery according to claim 1, wherein the holding members comprise a metal.

9. The stacked battery according to claim 1, wherein the positive electrode comprises a complex oxide.

10. The stacked battery according to claim 9, wherein the complex oxide is at least one of lithium-manganese complex oxide, lithium-cobalt complex oxide and lithium-nickel complex oxide.

11. A stacked battery according to claim 1, wherein the holding members are formed as rod-shaped members.

12. A stacked battery according to claim 1, wherein the holding members are formed as plate-shaped members.

* * * * *